US010547804B2

(12) United States Patent
Dai et al.

(10) Patent No.: US 10,547,804 B2
(45) Date of Patent: Jan. 28, 2020

(54) PIXEL READOUT STRUCTURE AND TIMING TO PROVIDE FIXED PATTERN NOISE REDUCTION IN IMAGE SENSORS

(71) Applicant: OmniVision Technologies, Inc., Santa Clara, CA (US)

(72) Inventors: Tiejun Dai, Santa Clara, CA (US); Jing Yin, Sunnyvale, CA (US); Rui Wang, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/291,917

(22) Filed: Oct. 12, 2016

(65) Prior Publication Data

US 2018/0103221 A1   Apr. 12, 2018

(51) Int. Cl.
*H04N 3/14*     (2006.01)
*H04N 5/235*    (2006.01)
*H04N 5/365*    (2011.01)
*H04N 5/378*    (2011.01)
*H04N 5/357*    (2011.01)
*H04N 5/3745*   (2011.01)
*H04N 5/369*    (2011.01)

(52) U.S. Cl.
CPC ......... *H04N 5/3658* (2013.01); *H04N 5/3575* (2013.01); *H04N 5/3577* (2013.01); *H04N 5/3655* (2013.01); *H04N 5/378* (2013.01); *H04N 5/379* (2018.08); *H04N 5/37452* (2013.01); *H04N 5/37457* (2013.01)

(58) Field of Classification Search
CPC ........ H04N 5/365; H04N 5/359; H04N 5/361; H04N 5/363; H04N 5/375; H04N 5/357
See application file for complete search history.

(56) References Cited

U.S. PATENT DOCUMENTS

| 7,253,837 | B2 | 8/2007 | Henderson et al. |
| 8,149,309 | B2 | 4/2012 | Tanaka |
| 9,088,741 | B2 | 7/2015 | Sumi et al. |
| 2004/0218095 | A1 | 11/2004 | Nguyen et al. |
| 2007/0064135 | A1 | 3/2007 | Brown et al. |
| 2007/0235631 | A1* | 10/2007 | Ladd ................... H04N 5/3575 250/208.1 |

(Continued)

FOREIGN PATENT DOCUMENTS

JP        2011145328 A       7/2011

OTHER PUBLICATIONS

ROC (Taiwan) Patent Application No. 106134646, Office Action and English translation dated Oct. 2, 2018, 6 pages.

(Continued)

*Primary Examiner* — Sinh Tran
*Assistant Examiner* — Selam T Gebriel
(74) *Attorney, Agent, or Firm* — Christensen O'Connor Johnson Kindness PLLC (57) ABSTRACT

Systems and methods for fixed pattern noise reduction in image sensors is disclosed herein. An example method may include simultaneously providing a pixel reference voltage of a pixel to a reference sampling capacitor and a signal sampling capacitor, decoupling the reference sampling capacitor from the pixel, providing a signal voltage to the signal sampling capacitor, and decoupling the signal sampling capacitor from the pixel.

20 Claims, 5 Drawing Sheets (56) References Cited

U.S. PATENT DOCUMENTS

| | | | | |
|---|---|---|---|---|
| 2009/0213259 A1* | 8/2009 | Su | ............... | H04N 5/3575 348/308 |
| 2009/0272879 A1* | 11/2009 | Dai | ............... | H04N 5/3559 250/208.1 |
| 2010/0231772 A1* | 9/2010 | Lebouleux | ......... | H04N 5/3658 348/308 |
| 2013/0187027 A1 | 7/2013 | Qiao et al. | | |
| 2015/0138410 A1 | 5/2015 | Dai et al. | | |

OTHER PUBLICATIONS

PRC (China) Patent Application No. 201710943299.8, Office Action and English translation dated Sep. 25, 2019, 16 pages.

* cited by examiner

PIXEL READOUT STRUCTURE AND TIMING TO PROVIDE FIXED PATTERN NOISE REDUCTION IN IMAGE SENSORS

TECHNICAL FIELD

This disclosure relates generally to image sensors, and in particular but not exclusively, relates to reduction of fixed pattern noise in image sensors.

BACKGROUND INFORMATION

Image sensors have become ubiquitous. They are widely used in digital still cameras, cellular phones, security cameras, as well as, medical, automobile, and other applications. The technology used to manufacture image sensors has continued to advance at a great pace. For example, the demands of higher resolution and lower power consumption have encouraged the further miniaturization and integration of these devices.

Various fixed pattern noise, such as vertical and horizontal fixed pattern noises, may cause unwanted noise in an image. Such fixed pattern noise may be caused by consistent differences in the individual responsivity of readout circuits, for example. Consistent variations between the readout of different rows of an array, for example, may produce the unwanted variations in the image.

Many techniques have been employed to mitigate the effects of fixed pattern noise and enhance image sensor performance. However, some of these methods may not entirely eliminate the effects of the vertical fixed pattern noise.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for an image sensor with reduced fixed pattern noise are described herein. In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Figure 1:
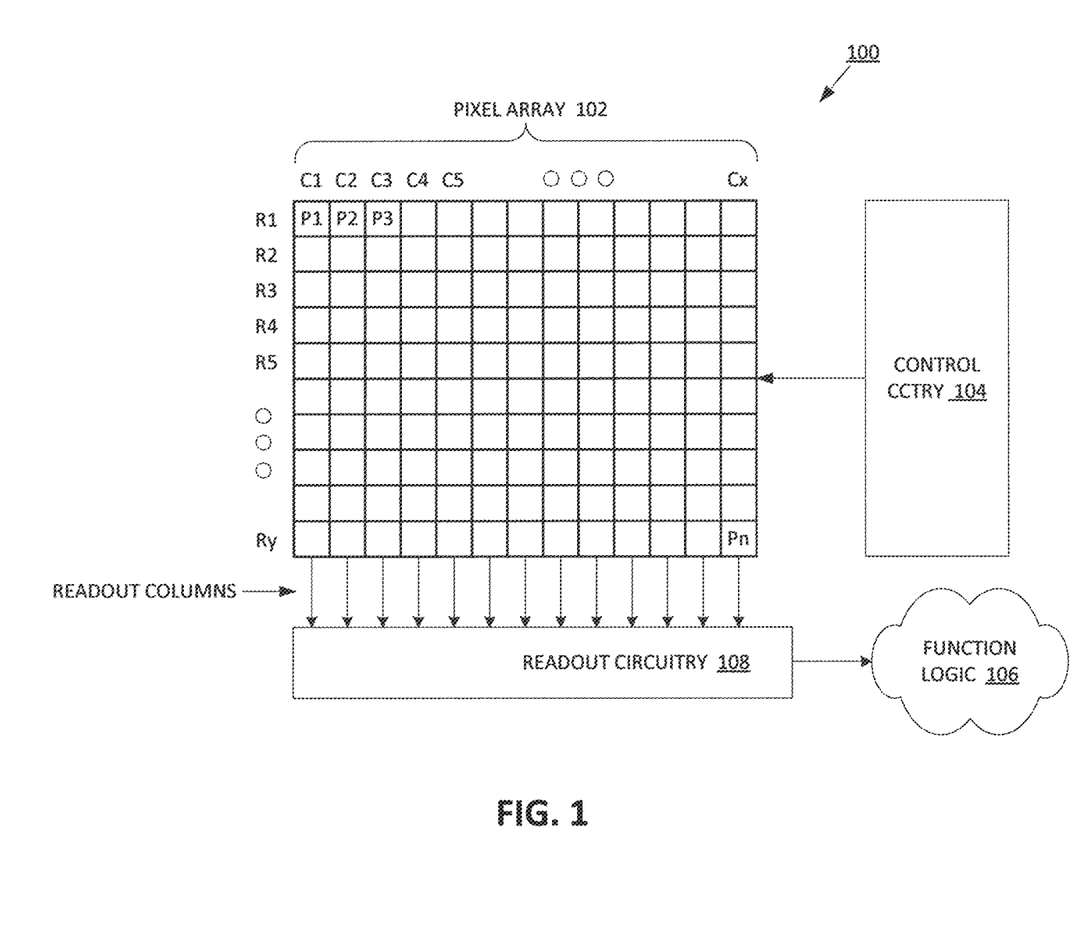
FIG. 1 illustrates one example of an imaging system in accordance with an embodiment of the present disclosure.

FIG. 1 illustrates one example of an imaging system 100 in accordance with an embodiment of the present disclosure. Imaging system 100 includes pixel array 102, control circuitry 104, readout circuitry 108, and function logic 106. In one example, pixel array 102 is a two-dimensional (2D) array of photodiodes, or image sensor pixels (e.g., pixels P1, P2 . . . , Pn). As illustrated, photodiodes are arranged into rows (e.g., rows R1 to Ry) and columns (e.g., column C1 to Cx) to acquire image data of a person, place, object, etc., which can then be used to render a 2D image of the person, place, object, etc. However, photodiodes do not have to be arranged into rows and columns and may take other configurations.

In some embodiments, the pixel array 102 may have sampling capacitors stacked on top of the pixel array. The stacked relationship may allow for a smaller chip footprint, for example. The sampling capacitors may be fabricated on the same chip as the photodiodes. Alternatively and/or additionally, the readout circuitry could be on a completely separate chip that is stacked onto a chip that includes the photodiodes. In either embodiment, readout circuitry may be capacitively coupled to floating diffusions of the pixels via parasitic capacitances. The sampling capacitors may include a reference voltage sampling capacitor and an image voltage sampling capacitor, and the sampling capacitors may be coupled to the readout columns, e.g., bitlines. The sampling capacitors may sample respective signals, e.g., voltages, on a floating diffusion of a pixel, which may be used to determine the image charge signal, for example.

In one example, after each image sensor photodiode/pixel in pixel array 102 has acquired its image data or image charge, the image data is readout by readout circuitry 108 and then transferred to function logic 106. Readout circuitry 108 may be coupled to readout image data from the plurality of photodiodes in pixel array 102. In various examples, readout circuitry 108 may include amplification circuitry, analog-to-digital (ADC) conversion circuitry, or otherwise. In some embodiments, one or more global amplifiers may be included for each of the readout columns. Function logic 106 may simply store the image data or even manipulate the image data by applying post image effects (e.g., crop, rotate, remove red eye, adjust brightness, adjust contrast, or otherwise). In one example, readout circuitry 108 may readout a row of image data at a time along readout column lines (illustrated) or may sequentially readout each pixel of a column before moving on to the next column. Alternatively, the readout circuitry 108 may read the image data using a variety of other techniques (not illustrated), such as a serial readout or a full parallel readout of all pixels simultaneously.

In some embodiments, the global amplifier, which may be a differential signal amplifier, associated with each readout column may be sequentially coupled to the sampling capacitors of each pixel in a column to readout the image charge from each those pixels. For example, the sampling capacitors of each pixel may be charged by the reference voltage, e.g., dark voltage, and the image charge of the respective pixel. The global amplifier may then receive the reference voltage and the image charge to provide an output, which may be an amplified representation of the image charge signal.

Due to the parasitic capacitances coupling a pixel's floating diffusion with the sampling capacitors, the image charge signal readout may be affected by the image charge signal readout from a previous pixel in the column. For example, when the image charge sampling capacitor of pixel A in row Y is coupled to the bitline, the image charge signal from an adjacent pixel A in row X (previously readout) may be capacitively coupled to the floating diffusion of pixel A in row Y. This may cause the image charge on the floating diffusion of pixel A in row Y to decrease. This decrease, when readout by the global amplifier, may appear as fixed pattern noise (FPN) since it may occur every time. However, if the reference voltage sampling capacitor is coupled simultaneously with the image charge sampling capacitor, the decrease in the voltage on the floating diffusion of pixel A of row Y may be sampled by both the image charge signal sampling capacitor and the reference voltage sampling capacitor. As such, when the differential readout is performed, the decrease will cancel itself out. As a result, the FPN, at least due to this noise creating capacitive coupling, may be reduced and/or eliminated. It should be noted that the reference voltage sampling capacitor will be coupled and decoupled to the pixel before the pixel's charge transfer gate transfers the image charge from the photodiode to the pixel's floating diffusion.

In one example, control circuitry 104 is coupled to pixel array 102 to control operation of the plurality of photodiodes in pixel array 102. For example, control circuitry 104 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows. In another example, image acquisition is synchronized with lighting effects such as a flash. In another example, the control circuitry 104 may be coupled to control the coupling/decoupling of the sampling capacitors to their respective pixels, along with row select and charge transfer signals.

In one example, imaging system 100 may be included in a digital camera, cell phone, laptop computer, or the like. Additionally, imaging system 200 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
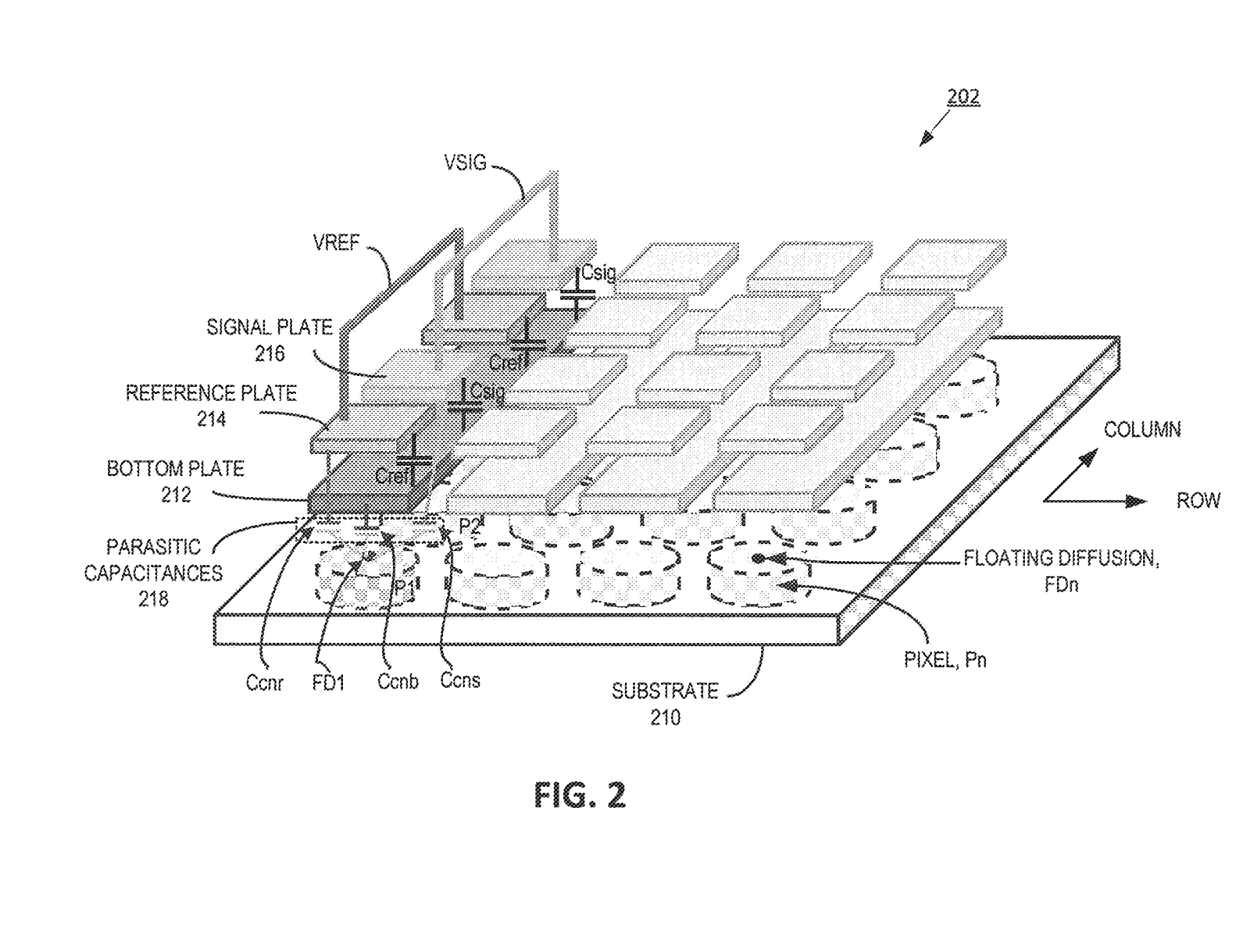
FIG. 2 is a schematic of readout circuitry in accordance with an embodiment of the present disclosure.

FIG. 2 is an example illustration of a pixel array 202 in accordance with an embodiment of the present disclosure. The pixel array 202 may be one example of the pixel array 102. The pixel array 202 may reduce FPN by altering a timing of the coupling of the sampling capacitors to each pixel, for example.

The illustrated embodiment of the pixel array 202 includes a substrate 210, an array of pixels Pn, a bottom plate 212, reference plates 214, and signal plates 216. The reference plates 214 may be coupled together to provide a voltage Vref. Similarly, the signal plates 216 may be coupled together to provide a voltage Vsig. The voltage Vref may be a dark voltage, e.g., pixel reference voltage, of the pixel Pn, which may represent a voltage on the floating diffusion (FD) n of the pixel Pn with the pixel in a dark state, e.g., no image charge on the floating diffusion. The voltage Vsig may represent a voltage on FDn when an image charge has been transferred from a pixel's photodiode to the pixel's floating diffusion, by a charge transfer gate, for example. In some embodiments, the pixels Pn may be four-transistor pixels, as is known in the art.

The bottom plate 212, reference plates 214, and signal plates 216 may each be formed from one or more metals, and the space between the bottom plate 212 and the reference plates 214 and the signal plates 216 may include one or more insulators. As such, capacitances Cref and Csig may be formed from the metal-insulator-metal (MIM) structure formed above the pixels Pn. The capacitance Cref may be a reference voltage sampling capacitor, and the capacitance Csig may be an image signal sampling capacitance. Further, the sampling capacitors Cref and Csig may be charged to respective voltage levels when coupled to a pixel Pn via respective control switches (not shown).

Due in part to the sampling capacitors Cref and Csig being disposed above the pixels Pn, parasitic capacitances 218 may be formed between FDn and the various sampling capacitances forming plates. For example, a parasitic capacitance Ccnr (where n denotes the pixel n) may be formed between FDn and the reference plates 214, a parasitic capacitance Ccnb may be formed between FDn and the bottom plate 212, and a parasitic capacitance Ccns may be formed between FDn and the signal plates 216. One or more of these parasitic capacitances 218 may affect the voltage level of FDn during a readout operation. For example, when reading the image charge from pixel P2, the image charge previously read from pixel P1 may affect the voltage on FD2. In some embodiments, the voltage on FD2 may be decreased due to the parasitic capacitance Cc2s being coupled to FD2 when pixel P2 is coupled to Csig. The decrease in voltage on FD2 may affect the dark voltage, e.g., pixel reference voltage, of pixel P2, which may generate FPN in an image after all pixels Pn have been read out, for example. As such, the dark voltage of subsequent pixels may be affected by the readout of a previous pixel in the same column.

Further, to limit the effect of the change in the dark voltage level of FDn due to the readout of FDn−1, the timing of the coupling of Csig and Cref to the pixel n may be adjusted. For example, both Csig and Cref may be coupled to the pixel simultaneously, and before image charge is transferred to FDn. This may be in contrast to separately coupling Csig and Cref to FDn. While the voltage of FDn may still be affected when Csig is coupled to FDn, the effect may also be incorporated onto Cref. As such, the change of the dark voltage of FDn may be accounted for during readout, which is a differential signal, and as a result may not create or add to FPN of the pixel array 202.

Figure 3:
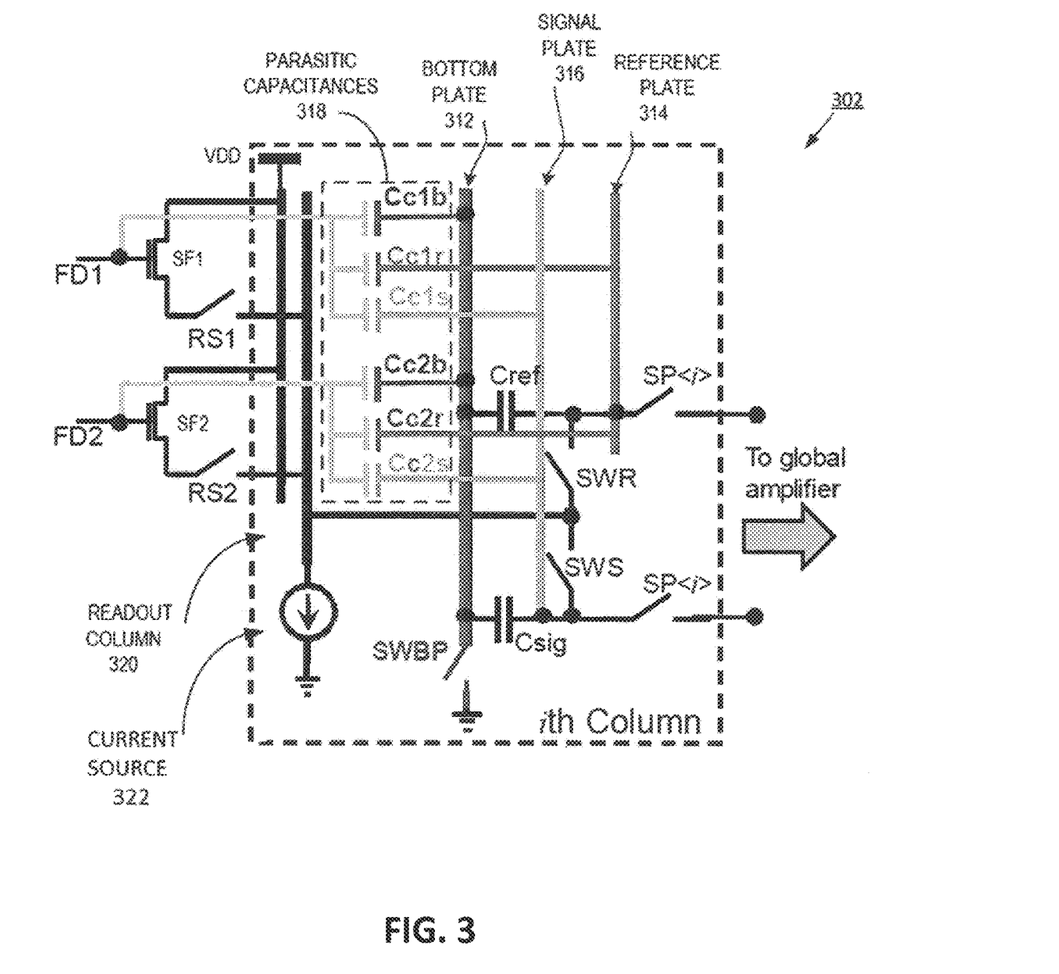
FIG. 3 is an illustration of a linear feedback shift register in accordance with an embodiment of the present disclosure.

FIG. 3 is an example schematic of a portion of a pixel array 302 in accordance with an embodiment of the present disclosure. The portion of the pixel 302 may be an example of the pixel arrays 102 and/or 202 if extended out to include an entire array. The portion of the pixel array 302 shows only two pixels, and the timing of the sequential coupling of FD1 and FD2 to a global amplifier may reduce and/or eliminate FPN included in an image after readout of an entire pixel array, at least with respect to parasitic capacitances coupling the floating diffusions to the various plates.

The illustrated embodiment of the portion of the pixel array 302 includes floating diffusions FD1 and FD2, source-follower transistors SF1 and SF2, row select switches RS1 and RS2, readout column 320, current source 322, bottom plate 312, signal plate 316, reference plate 314, sampling capacitors Cref and Csig, switch SWBP, reference sampling switch SWR, signal sampling switch SWS, and switches SP<i>. Additionally, parasitic capacitances 318 may be formed between the bottom plate 312, the signal plate 316, and the reference plate 314 and the floating diffusions FD1 and FD2. The portion of the pixel array 302, while only showing two pixels of a single column, may have y pixels in x rows, where each pixel P1 through PY of a column C1 may be readout sequentially before the pixels of a column C2 may be read out, for example.

The source follower transistors SF1 and SF2 may be enabled in response to charge on the floating diffusions FD1 and FD2, respectively. The amount of charge on the FDn may determine an amount of voltage is applied to a gate of the SFn. As such, a derivative of VDD may be provided to the readout column 320 that represents the amount of charge on FDn. The derivative of VDD provided to the readout column may be the dark voltage, e.g., Vref, of the pixel Pn when sampled prior to image charge being transferred to FDn, and may be the image signal, e.g., Vsig, when sampled after the image charge is transferred to FDn. The transfer of the image charge may be controlled by a control signal TX applied to a gate of a charge transfer gate (not shown) disposed between FDn and a photodiode PDn. The control of the charge transfer gate may be controlled by the control circuitry 104, for example.

The row select switches RS1 and RS2 may be controlled to couple/decouple a respective floating diffusion from the readout column 320 in a sequential manner. The control of the row select switches RS1 and RS2 may be controlled by the control circuitry 104, for example. The row select switches RSn may be closed to couple a respective floating diffusion prior to sampling of the reference and signal voltages, then opened to decouple the respective floating diffusion before reading a subsequent pixel.

The reference sampling switch SWR may be closed to couple the sampling capacitor Cref to the readout column 320. SWR may be opened to decouple the same, which may generally occur prior to the transfer of image charge to the floating diffusion. Similarly, the signal sampling switch SWS may be closed to couple the sampling capacitor Csig to the readout column 320, and closed to decouple the same after the image charge has been transferred to the floating diffusion. The switch SWBP may couple/decouple the bottom plate 312 from ground. When decoupled from ground, the bottom plate 312 may be floating.

The switches SP<i> may be controlled to couple/decouple the sampling capacitors Cref and Csig to respective differential lines coupled to a global amplifier. The global amplifier, which may be a two stage sense amplifier in some embodiments, may determine the voltage level of the signal voltage Vsig relative to the reference voltage Vref, and amplify the same. The output of the global amplifier, for example, may be provided to a comparator for analog to digital conversion.

Figure 4:
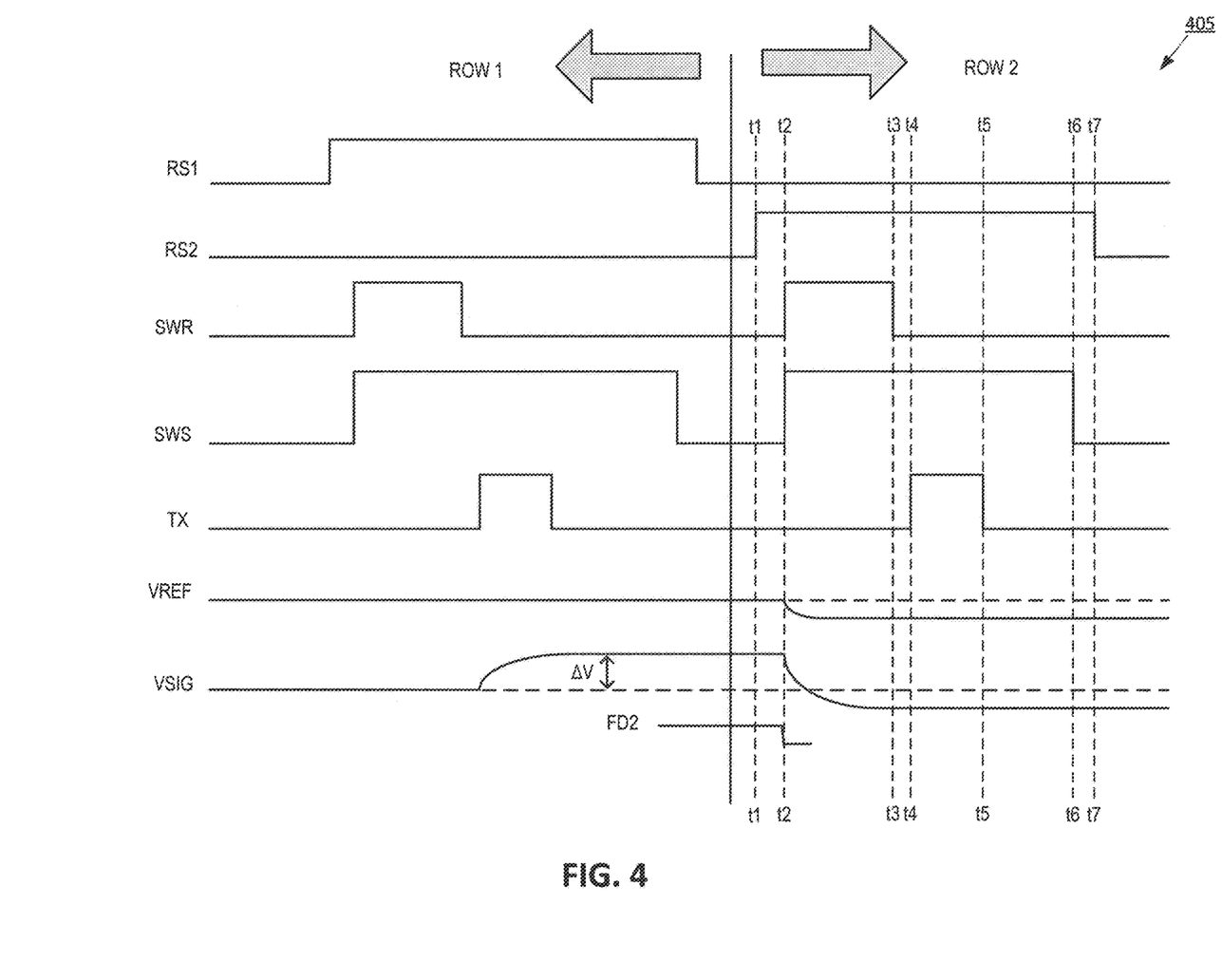
FIG. 4 is an example timing diagram according to an embodiment of the present disclosure.

FIG. 4 is an example timing diagram 405 according to an embodiment of the present disclosure. The timing diagram 405 may be used to illustrate the operation of the portion of the pixel array 302, the pixel array 202, and the pixel array 102. While the timing diagram 405 illustrates the readout of image data from row 1 and 2, the focus of the illustration will be on row 2, e.g., time t1 through t7. The lines VREF and VSIG illustrate the voltages sampled by sampling capacitors Cref and Csig, respectively.

Prior to time t1, image charge on FD1 of a pixel P1 was read out by the global amplifier. During the readout, the signal voltage Vsig may have been sampled by Csig. This signal voltage is shown as ΔV. The signal voltage ΔV may remain on the sampling capacitor Csig after the row select switch RS1 decouples FS1 from the readout column 320 and the sampling capacitor Csig.

At time t1, the row select switch RS2 is closed, e.g., enabled, due to the control signal RS2 transitioning to a high level. Enabling RS2 which couples FD2 of a pixel P2 to the readout column 320 via SF2. At time t2, reference sampling switch SWR and signal sampling switch SWS may be closed due to their respective control signals transitioning to a high level, which may couple respective sampling capacitors Cref and Csig to the readout column 320. This allows the sampling capacitors Cref and Csig to sample the voltage on FD2 via SF2. Additionally at time t2, the enabling of the signal sampling switch SWS may couple ΔV to FD2 via the parasitic capacitance Cc2s. The coupling of ΔV to FD2 may cause the voltage on FD2 to decrease, as shown at the bottom of the timing diagram 405. It should be noted that the voltage on FD2 at time t2 may be the dark voltage of FD2, e.g., the pixel reference voltage. As a result, the dark voltage, e.g., pixel reference voltage, of FD2 may be changed by the coupling of ΔV through the parasitic capacitance Cc2s. However, even though the dark voltage of FD2 may be decreased due to the coupling of ΔV, the sampling capacitor Cref may also sample the change in the dark voltage of FD2 since Cref is also coupled to FD2 via SF2. As such, the differential signaling of the global amplifier may eliminate or reduce any affect ΔV may have on VSIG of pixel 2.

At time t3, the reference sampling switch SWR may be opened, e.g., disabled, due to the control signal transitioning low, which decouples Cref from the readout column 320. At time t4, a transfer gate of pixel 2 is enabled due to the TX control signal transitioning high, which may allow image charge to transfer from a photodiode of pixel 2 to FD2. The image charge on FD2 may represent the signal voltage, for example. With image charge on FD2, SF2 may be turned on to provide a signal voltage to Csig. In the timing diagram 405, the image charge on FD2 may be zero, which may not affect the voltage on Csig. Csig, however, may maintain the decrease due to the coupling of ΔV to FD2. At time t5, the transfer gate may be disabled due to the transition to low of TX, which may isolate FD2 from the photodiode of pixel 2.

At time t6, the signal sampling switch SWS may be closed due to the control signal transitioning low, which may decouple Csig from the readout column 320. At time t7, the row select switch RS2 may be opened due to the control signal transitioning low, which may decouple FD2 from the readout column 320. As a result, the image charge of pixel 2 has been provided to the global amplifier. However, because both Cref and Csig sampled the decrease in voltage on FD2, any potential FPN due to the parasitic coupling of ΔV from FD1 to FD2 may be reduced or eliminated.

Figure 5:
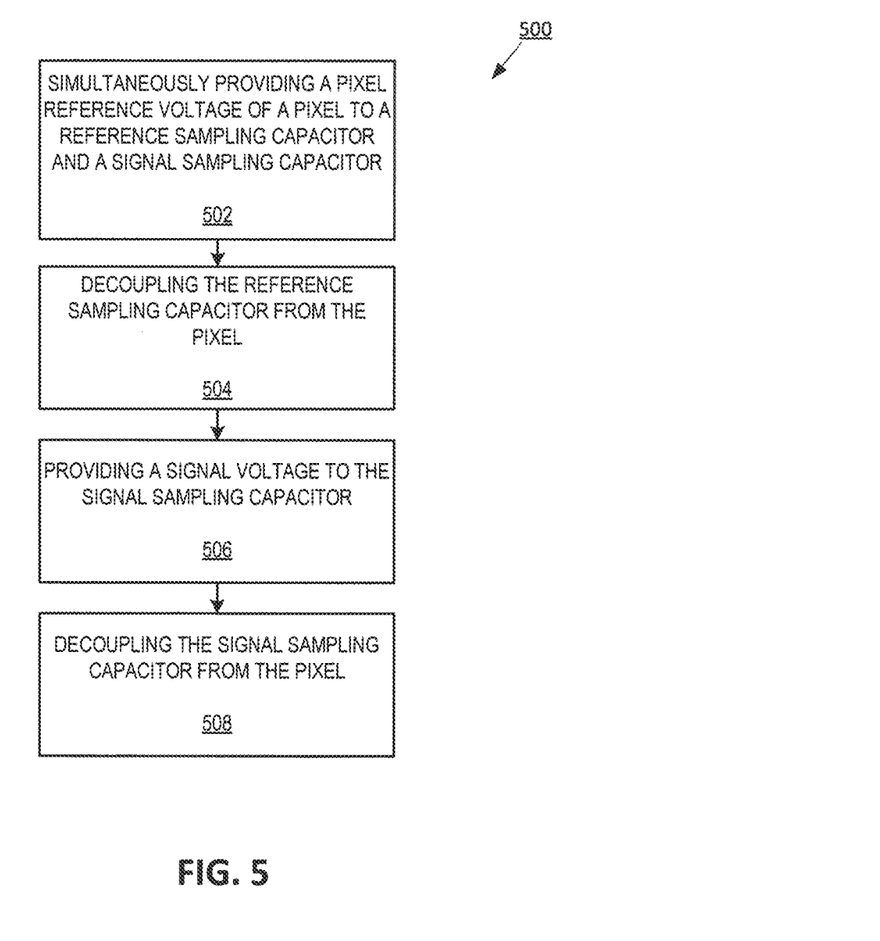
FIG. 5 is an example method in accordance with an embodiment of the present disclosure.

FIG. 5 is an example process 500 in accordance with an embodiment of the present disclosure. The process 500 may be an example method of operation of the pixel array 102, pixel array 202, and/or the portion of the pixel array 302. For discussion, the method 500 will be illustrated with regards to the portion of the pixel array 302.

The process 500 may begin with process block 502. Process block 502 may include simultaneously providing a pixel reference voltage of a pixel to a reference sampling capacitor and a signal sampling capacitor. For example, the sampling capacitors Cref and Csig may be coupled to FD2 via reference sampling switch SWR and signal sampling switch SWS, respectively. In some embodiments, FD2 may be coupled to readout column 320 via SF2 and RS2, and the sampling capacitors may also be coupled to readout column 320.

Process block 502 may be followed by process block 504, which includes decoupling the reference sampling capacitor from the pixel. In some embodiments, decoupling the reference sampling capacitor from the pixel may include disabling the reference sampling switch SWR, for example.

Process block 504 may be followed by process block 506, which includes providing a signal voltage to the signal sampling circuit. In some embodiments, providing the signal voltage to the signal sampling circuit may include transferring image charge from a photodiode of the pixel to FD2, for example. Additionally, the image charge on FD2 may represent the signal voltage, which may enable SF2. Enabling SF2 may provide the signal voltage to the signal sampling capacitor Csig, for example.

Process block 506 may be followed by process block 508, which includes decoupling the signal sampling capacitor from the pixel. In some embodiments, decoupling the signal sampling capacitor from the pixel may include disabling the signal sampling switch SWS, for example.

After the pixel reference voltage and the signal voltage have been transferred to their respective sampling capacitors Cref and Csig, the sampling capacitors may be coupled to a global amplifier via respective differential signal lines. As such, the global amplifier may amplify the signal voltage, for example.

The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A method, comprising:
    simultaneously providing a pixel reference voltage of a pixel to a second terminal of a reference sampling capacitor and a second terminal of a signal sampling capacitor, wherein a first terminal of the reference sampling capacitor is always electrically connected to a first terminal of the signal sampling capacitor such that a voltage at the first terminal of the reference sampling capacitor is always substantially the same as a voltage at the first terminal of the signal sampling capacitor;
    decoupling the second terminal of the reference sampling capacitor from the pixel while the first terminal of the reference sampling capacitor remains electrically connected to the first terminal of the signal sampling capacitor;
    providing a signal voltage to the second terminal of the signal sampling capacitor while the first terminal of the reference sampling capacitor remains electrically connected to the first terminal of the signal sampling capacitor; and
    decoupling the second terminal of the signal sampling capacitor from the pixel while the first terminal of the reference sampling capacitor remains electrically connected to the first terminal of the signal sampling capacitor.

2. The method of claim 1, wherein the simultaneously providing the pixel reference voltage of the pixel to the second terminal of the reference sampling capacitor and the second terminal of the signal sampling capacitor comprises:
    simultaneously coupling the second terminal of the reference sampling capacitor to a column readout line and the second terminal of the signal sampling capacitor to the column readout line.

3. The method of claim 2, wherein the simultaneously coupling the second terminal of the reference sampling capacitor and the second terminal of the signal sampling capacitor to the column readout line charges both the reference sampling capacitor and the signal sampling capacitor with the pixel reference voltage of the pixel.

4. The method of claim 1, wherein the providing the signal voltage to the second terminal of the signal sampling capacitor comprises:
    coupling a floating diffusion of the pixel to a photodiode of the pixel; and
    decoupling the floating diffusion from the photodiode.

5. The method of claim 4, wherein image charge on the photodiode is transferred to the floating diffusion due to the coupling to generate the signal voltage on the floating diffusion, and wherein the signal voltage on the floating diffusion is coupled to the second terminal of the signal sampling capacitor via a source follower transistor to charge the signal sampling capacitor with the signal voltage.

6. The method of claim 1, further comprising:
    coupling a source follower transistor of the pixel to a column readout line, wherein coupling the source follower transistor to the column readout line couples an amplified representation of the signal voltage from a floating diffusion of the pixel to the column readout line.

7. The method of claim 1, further comprising:
    coupling differential lines to the second terminal of the reference sampling capacitor and the second terminal of the signal sampling capacitor to provide the reference voltage on the reference sampling capacitor and the signal voltage on the signal sampling capacitor to an amplifier; and decoupling the differential lines from the second terminal of the reference sampling capacitor and the second terminal of the signal sampling capacitor.

8. A method, comprising:

simultaneously charging a second terminal of a reference sampling capacitor and a second terminal of a signal sampling capacitor with a pixel reference voltage, wherein a first terminal of the reference sampling capacitor is always electrically connected to a first terminal of the signal sampling capacitor such that a voltage at the first terminal of the reference sampling capacitor is always substantially the same as a voltage at the first terminal of the signal sampling capacitor;

charging the second terminal of the signal sampling capacitor with a signal voltage while the first terminal of the reference sampling capacitor remains electrically connected to the first terminal of the signal sampling capacitor; and providing the pixel reference voltage from the second terminal of the reference sampling capacitor and the signal voltage and the pixel reference voltage from the second terminal of the signal sampling capacitor to an amplifier while the first terminal of the reference sampling capacitor remains electrically connected to the first terminal of the signal sampling capacitor.

9. The method of claim 8, wherein the simultaneously charging the second terminal of the reference sampling capacitor and the second terminal of the signal sampling capacitor with the pixel reference voltage comprises:

coupling the pixel reference voltage of a pixel to the second terminal of the reference sampling capacitor via a reference sampling switch; and coupling the pixel reference voltage of the pixel to the second terminal of the signal sampling capacitor via a signal sampling switch.

10. The method of claim 8, wherein the simultaneously charging the second terminal of the reference sampling capacitor and the second terminal of the signal sampling capacitor with the pixel reference voltage comprises:

coupling the pixel reference voltage from a floating diffusion of a pixel to a column readout line via a row select switch;

enabling a reference sampling switch coupled between the column readout line and the second terminal of the reference sampling capacitor; and enabling a signal sampling switch coupled between the column readout line and the second terminal of the signal sampling capacitor.

11. The method of claim 10, wherein the enabling the reference sampling switch coupled between the column readout line and the second terminal of the reference sampling capacitor, and the enabling the signal sampling switch coupled between the column readout line and the second terminal of the signal sampling capacitor charges the reference sampling capacitor and the signal sampling capacitor with the pixel reference voltage.

12. The method of claim 8, wherein the charging the second terminal of the signal sampling capacitor with the signal voltage comprises:

transferring image charge from a photodiode of a pixel to a floating diffusion of a pixel, wherein the image charge on the floating diffusion generates the signal voltage; and coupling the floating diffusion of the pixel to the second terminal of the signal sampling capacitor.

13. The method of claim 8, wherein the charging the second terminal of the signal sampling capacitor with the signal voltage occurs after the second terminal of the reference sampling capacitor is decoupled from a pixel providing the pixel reference voltage.

14. The method of claim 8, wherein the pixel reference voltage is a dark voltage of a pixel.

15. A method, comprising:

coupling a second terminal of a reference sampling capacitor to a floating diffusion of a pixel;

coupling a second terminal of a signal sampling capacitor to the floating diffusion of the pixel, wherein a first terminal of the reference sampling capacitor is always electrically connected to a first terminal of the signal sampling capacitor such that a voltage at the first terminal of the reference sampling capacitor is always substantially the same as a voltage at the first terminal of the signal sampling capacitor, wherein the coupling the second terminal of the reference sampling capacitor and the second terminal of the signal sampling capacitor to the floating diffusion charges both the reference sampling capacitor and the signal sampling capacitor with a pixel reference voltage;

decoupling the second terminal of the reference sampling capacitor from the floating diffusion while the first terminal of the reference sampling capacitor remains electrically connected to the first terminal of the signal sampling capacitor; and charging the second terminal of the signal sampling capacitor with a signal voltage on the floating diffusion while the first terminal of the reference sampling capacitor remains electrically connected to the first terminal of the signal sampling capacitor.

16. The method of claim 15, wherein charging the second terminal of the signal sampling capacitor with the signal voltage on the floating diffusion comprises:

transferring image charge to the floating diffusion via a charge transfer gate, wherein the image charge on the floating diffusion is the signal voltage; and transferring the signal voltage to the signal sampling circuit via a source follower transistor.

17. The method of claim 15, wherein the coupling the second terminal of the reference sampling capacitor to the floating diffusion of the pixel comprises:

coupling the pixel reference voltage from the floating diffusion to a column readout line via a source follower transistor; and coupling the second terminal of the reference sampling capacitor to the column readout line.

18. The method of claim 17, wherein the coupling the second terminal of the signal sampling capacitor to the floating diffusion of the pixel comprises:

coupling the second terminal of the signal sampling capacitor to the column readout line.

19. The method of claim 18, wherein the coupling the second terminal of the reference sampling capacitor to the column readout line, and the coupling the second terminal of the signal sampling capacitor to the column readout line comprises:

enabling a reference sampling switch and a signal sampling switch.

20. The method of claim 15, further comprising:
coupling the second terminal of the reference sampling capacitor and the second terminal of the signal sampling capacitor to respective differential signal lines of an amplifier.

\* \* \* \* \*